(12) United States Patent
Tabuchi et al.

(10) Patent No.: US 6,286,650 B1
(45) Date of Patent: Sep. 11, 2001

(54) COIL-ROTATION TYPE ELECTROMAGNETIC CLUTCH

(75) Inventors: Yasuo Tabuchi, Toyoake; Toshihiro Hayashi, Chiryu, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/450,701

(22) Filed: Nov. 30, 1999

(30) Foreign Application Priority Data

Dec. 15, 1998 (JP) .................................................. 10-356477

(51) Int. Cl.$^7$ .................................................. F16D 27/112
(52) U.S. Cl. .................................... 192/84.94; 192/84.961
(58) Field of Search ........................... 192/84.94, 84.941, 192/84.961, 200; 267/161, 181; 464/169, 162, 98

(56) References Cited

U.S. PATENT DOCUMENTS

| | | | |
|---|---|---|---|
| 2,407,757 | * 9/1946 | MacCallum | 192/84.94 |
| 3,727,736 | * 4/1973 | Miller et al. | 192/84.94 |
| 3,762,516 | * 10/1973 | Matsushita | 192/84.94 |
| 3,788,099 | * 1/1974 | Miller | 464/98 |
| 4,471,862 | * 9/1984 | Sugita | 192/84.961 |
| 4,523,916 | * 6/1985 | Kizler et al. | 464/98 |
| 4,574,930 | * 3/1986 | Koitabashi | 192/84.941 |
| 4,871,342 | * 10/1989 | Boss et al. | 464/98 |
| 4,984,668 | * 1/1991 | Onishi et al. | 192/84.94 X |
| 5,138,293 | * 8/1992 | Ishimaru | 192/84.94 X |
| 5,445,256 | 8/1995 | Tabuchi et al. . | |

* cited by examiner

*Primary Examiner*—Rodney H. Bonck
(74) *Attorney, Agent, or Firm*—Pillsbury Winthrop LLP

(57) ABSTRACT

In order to reduce an electromagnetic clutch in an axial size, a ring-shaped leaf spring connects an armature to a hub. The leaf spring has an outer ring portion connected to the armature, an attachment portion connected to the hub and located inner than the outer ring portion, and a connecting portion for connecting the outer ring portion and the attachment portion. A plurality of rivets of the armature are disposed at the outer ring portion. An embossed portion for generating an initial deflection on the leaf spring is disposed at an intermediate portion between the rivets in the circumferential direction of the outer ring portion.

8 Claims, 16 Drawing Sheets

COIL-ROTATION TYPE ELECTROMAGNETIC CLUTCH

CROSS REFERENCE TO RELATED APPLICATIONS

This application is based upon and claims priority from Japanese patent application No. Hei 10-356477 filed Dec. 15, 1998, the entire contents of which are incorporated herein by reference.

BACKGROUND OF THE INVENTION

1. Field of the Invention

The present invention relates to an electromagnetic clutch that transmits and cuts rotational power and that is particularly suitable for driving a compressor for an automobile air conditioning apparatus.

2. Description of Related Art

One type of known electromagnetic clutch for a compressor is disclosed in JP-U-6-30535. The electromagnetic clutch has a rotor which is driven by a driving source such as an engine and has an armature which is disposed opposite the rotor keeping a predetermined small gap between them. The armature is supported by a hub of the driven side via a leaf spring.

When an electromagnetic coil is energized to generate an electromagnetic attractive force, the armature is attracted to the rotor, and the armature is attached to the rotor by an elastic deformation of the leaf spring. Consequently, the rotation of the rotor is transmitted to the driven-side hub via the armature and the leaf spring, and a compressor connected to the hub is operated.

However, according to the above described electromagnetic clutch, a triangle-shaped flange portion, extended outwardly in the radial direction, is unitarily formed with the driven-side hub. One ends of a plurality of the leaf springs (for example, three leaf springs) are connected to the flange portion, and the other ends of the leaf springs are connected to the armature.

Accordingly, in an axial direction of the electromagnetic clutch, the flange portion of the driven-side hub is piled up on the leaf spring as well as the armature is piled up on the leaf spring. Consequently, the electromagnetic clutch is increase in size in the axial direction, and the mounting performance of the electromagnetic clutch on a limited space such as an engine compartment is decreased.

Furthermore, since a plurality of leaf springs are used, the assembly of the leaf springs are complicated, thereby increasing the manufacturing cost of the electromagnetic clutch.

SUMMARY OF THE INVENTION

The present invention is made in light of the foregoing problems, and it is an object of the present invention to provide an electromagnetic clutch which reduces its size in the axial direction and simplifies its structure.

According to an electromagnetic clutch of the present invention, ring-shaped leaf spring, which connects an armature with a slave-side rotating member, includes an outer ring portion connected to the armature, an attachment portion connected to the slave-side rotating member and located inner than the outer ring portion, and a connecting portion for connecting the outer ring portion and the attachment portion.

The armature includes a plurality of fixing portions provided on the outer ring portion, and a deflection generating portion for generating an initial deflection on the leaf spring is disposed between the fixing portions.

Accordingly, the initial deflection is given to the ring-shaped leaf spring by the deflection generating portion provided on the leaf spring or the armature. Therefore, it is not necessary to arrange the armature, leaf spring and the slave-side rotating member (driven-side hub) in the axial direction like the prior art, and only the armature and the ring-shaped leaf spring are arranged in the axial direction.

Consequently, the electromagnetic clutch is reduced in size in the axial direction, and mounting the electromagnetic clutch on a limited space, such as an engine compartment, is facilitated.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Embodiments of the present invention will be described hereinafter with reference to the drawings.

(First Embodiment)

Figure 1:
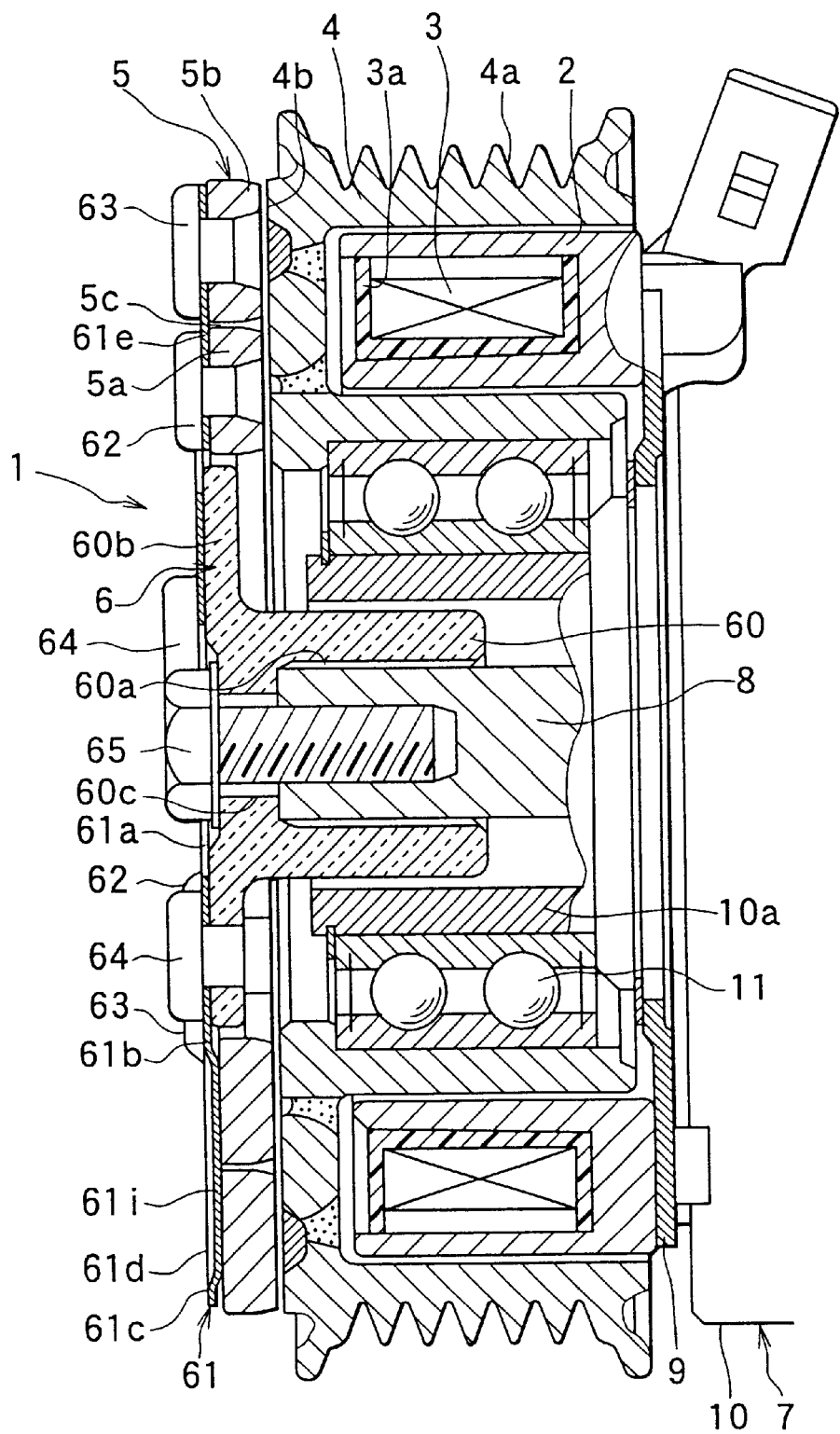
FIG. 1 is a longitudinal sectional view of an electromagnetic clutch according to a first embodiment of the present invention.

A first embodiment of the present invention is shown in FIGS. 1 through 5. It is to be noted that bolt connected portion in FIG. 1 is omitted in FIG. 2.

The electromagnetic clutch 1 includes an electromagnetic coil 3 accommodated in a stator 2, a rotor 4 (drive-side rotation member) driven by an engine (driving source) for a vehicle (not shown), an armature 5 to be attracted to the rotor 4 by a magnetic force generated by the electromagnetic coil 3, and a hub 6 (driven-side rotation member) connected to the armature 5 to rotate together with the armature 5. The hub 6 is connected to a drive shaft 8 of a compressor 7 (driven-side device) to transmit the rotation power to the compressor 7.

The electromagnetic coil 3 is wound around a resin spool 3a, and is accommodated in the U-shaped stator 2 made of a magnetic material such as iron, and is fixed in the stator 2 by molding an electrical insulation resin such as epoxy resin. The stator 2 is fixed to a housing 10 of the compressor 7 via a ring-shaped support member 9 (see FIGS. 1 and 3).

The rotor 4 has a pulley 4a which is engaged with a multi-stage V-belt (not shown) on its periphery, and rotates according to a rotational force of the engine transmitted via the V-belt.

The rotor 4 is made of a magnetic material such as iron, and has a U-shaped cross section to accommodate the stator 2 keeping a small gap between them. The rotor 4 also has a bearing 11 at its inner periphery. The rotor 4 is rotatably supported by the bearing 11 on an outer peripheral surface of a cylindrical boss 10a of the housing 10.

The armature 5 is provided opposite a friction surface 4b of the rotor 4 keeping a predetermined small gap (for example, 0.5 mm) between the armature 5 and the friction surface 4b. The armature 5 is made of magnetic material such as iron, and is formed in a shape of a ring (see FIG. 2). The armature 5 includes an inner ring 5a and an outer ring 5b which is provided at an outer periphery of the inner ring 5a keeping a predetermined gap 5c for a magnetic shield.

Figure 5:
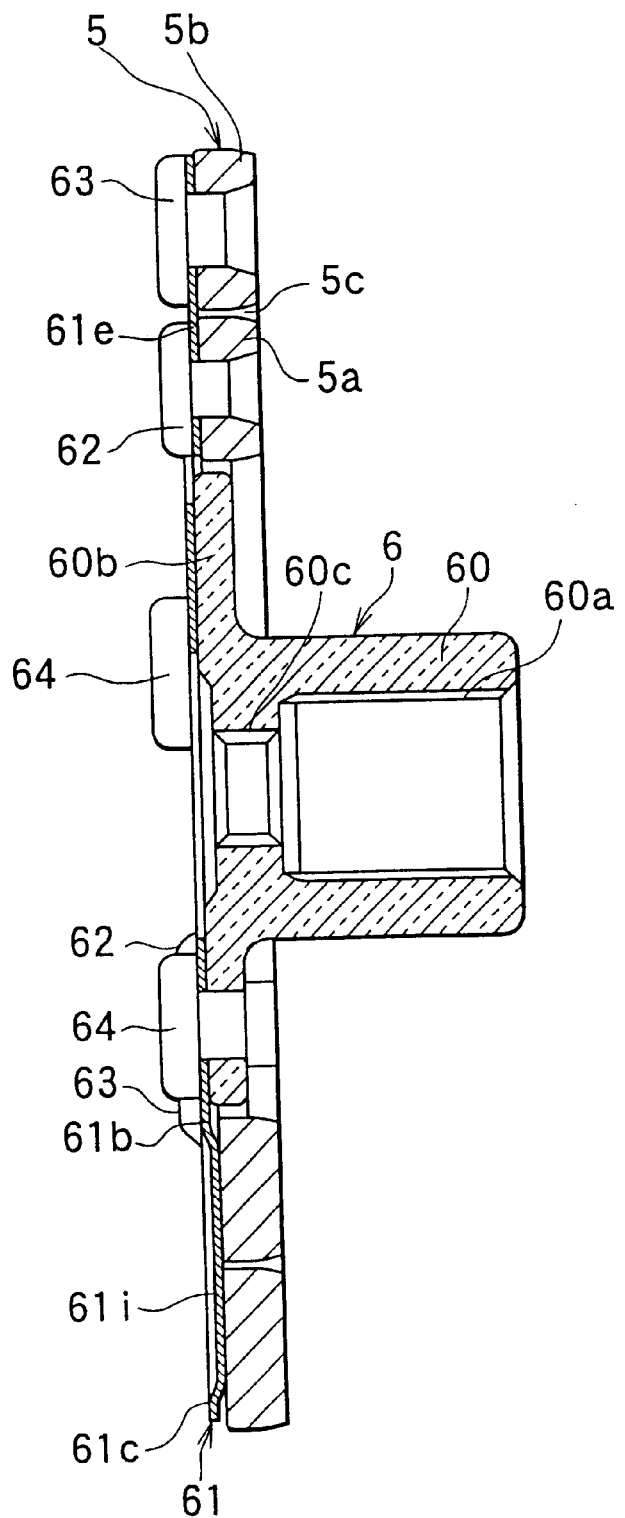
FIG. 5 is a sectional view of a hub of the electromagnetic clutch according to the first embodiment of the present invention.

Details of the hub 6 will now be described according to FIG. 5. The hub 6 includes a cylindrical inner hub 60 made of metal such as iron. A spline 60a is formed on an inner periphery of the inner hub 60 to unitarily fit the inner hub 60 to the drive shaft 8 in a rotational direction. The inner hub 60 has a ring-shaped flange 60b outwardly extends in a radial direction from an axial edge of the inner hub 60 (from a tip side of the drive shaft 8).

A ring-shaped leaf spring 61 connects the armature 5 to the inner hub 60. The leaf spring 61 is made of an elastic metal including iron, such as SK5 or S65CM, or an elastic metal including nonmagnetic stainless (austenitic stainless steel family), and has a thickness of about 0.6 mm.

Figure 4B:
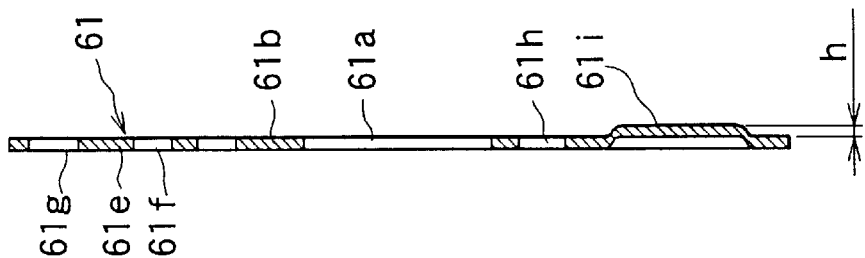
FIG. 4B is a sectional view of FIG. 4A according to the first embodiment of the present invention.
Figure 4A:
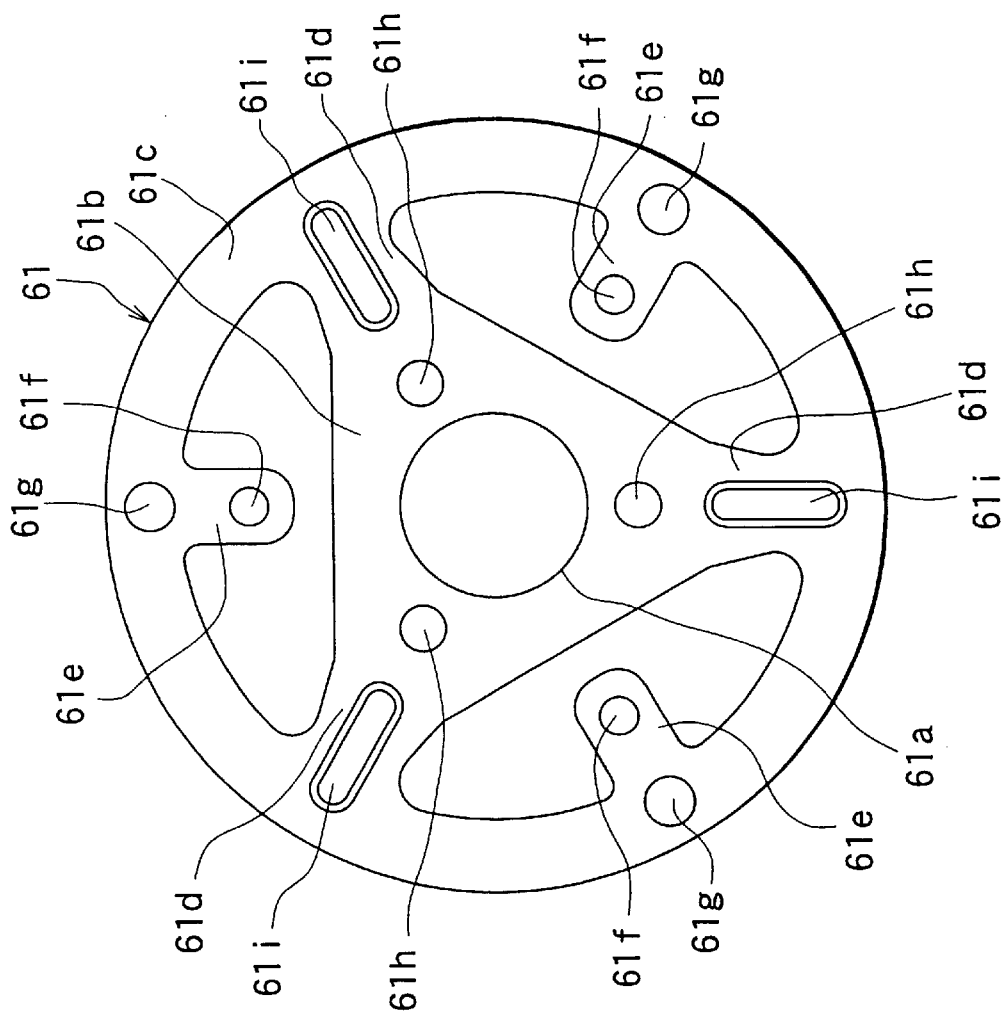
FIG. 4A is a front view of a ring-shaped leaf spring of the electromagnetic clutch according to the first embodiment of the present invention.

As shown in FIGS. 4A and 4B, the leaf spring 61 has a center hole 61a, an approximately triangle-shaped attachment portion 61b, and an outer ring portion 61c. The outer ring portion 61c and tips of the attachment portion 61b are connected by three connecting portions 61d. The ring-shaped leaf spring 61 is formed by pressing.

Three arm portions 61e are provided on the outer ring portion 61c. The arm portion 61e has a rivet hole 61f. Rivet holes 61g are formed on the outer ring portion 61c adjacent to the rivet holes 61f. The attachment portion 61b also has three rivet holes 61h.

Figure 2:
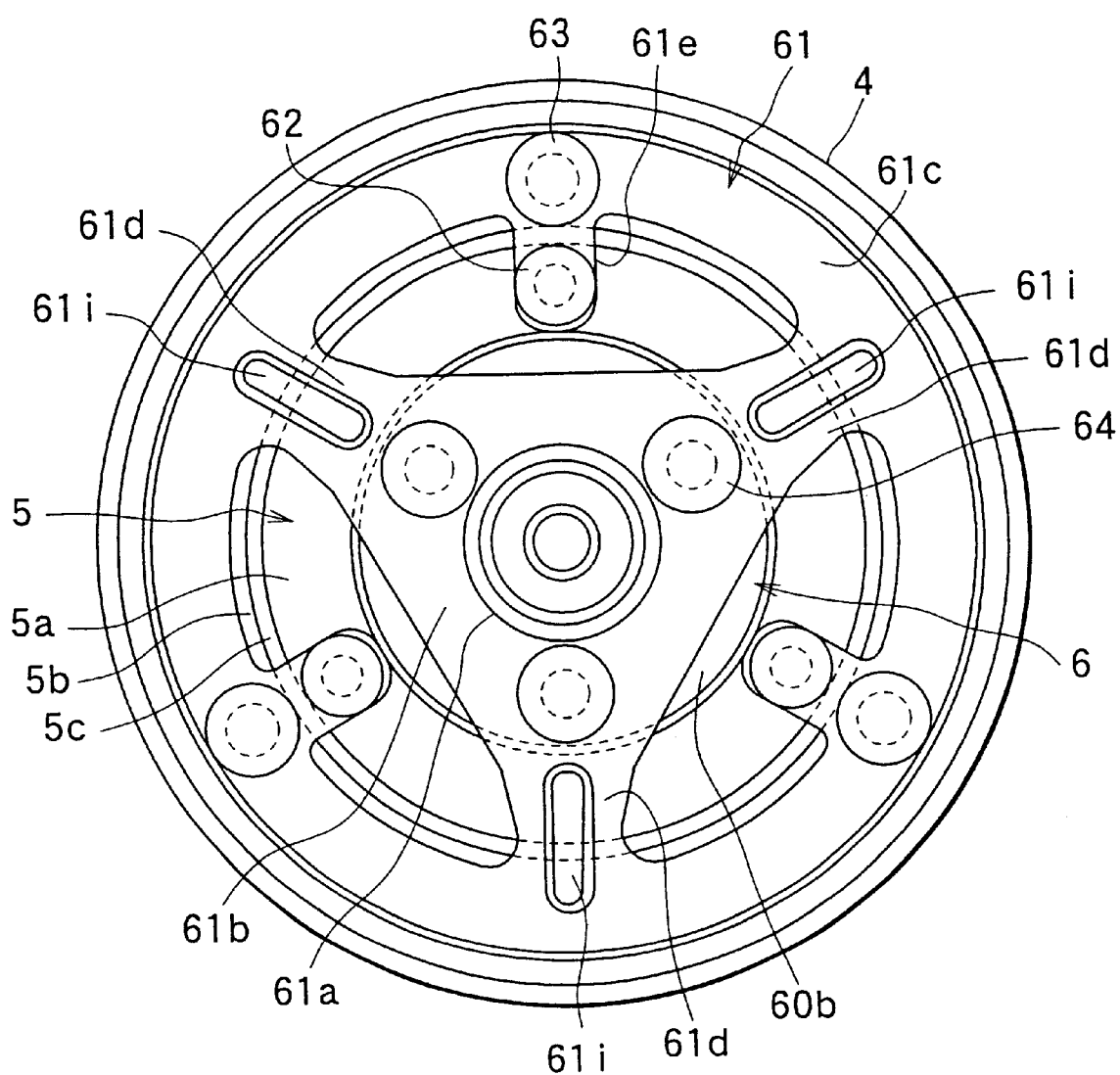
FIG. 2 is a front view of the electromagnetic clutch detached from a compressor viewed from left side in FIG. 1 according to the first embodiment of the present invention.
Figure 3:
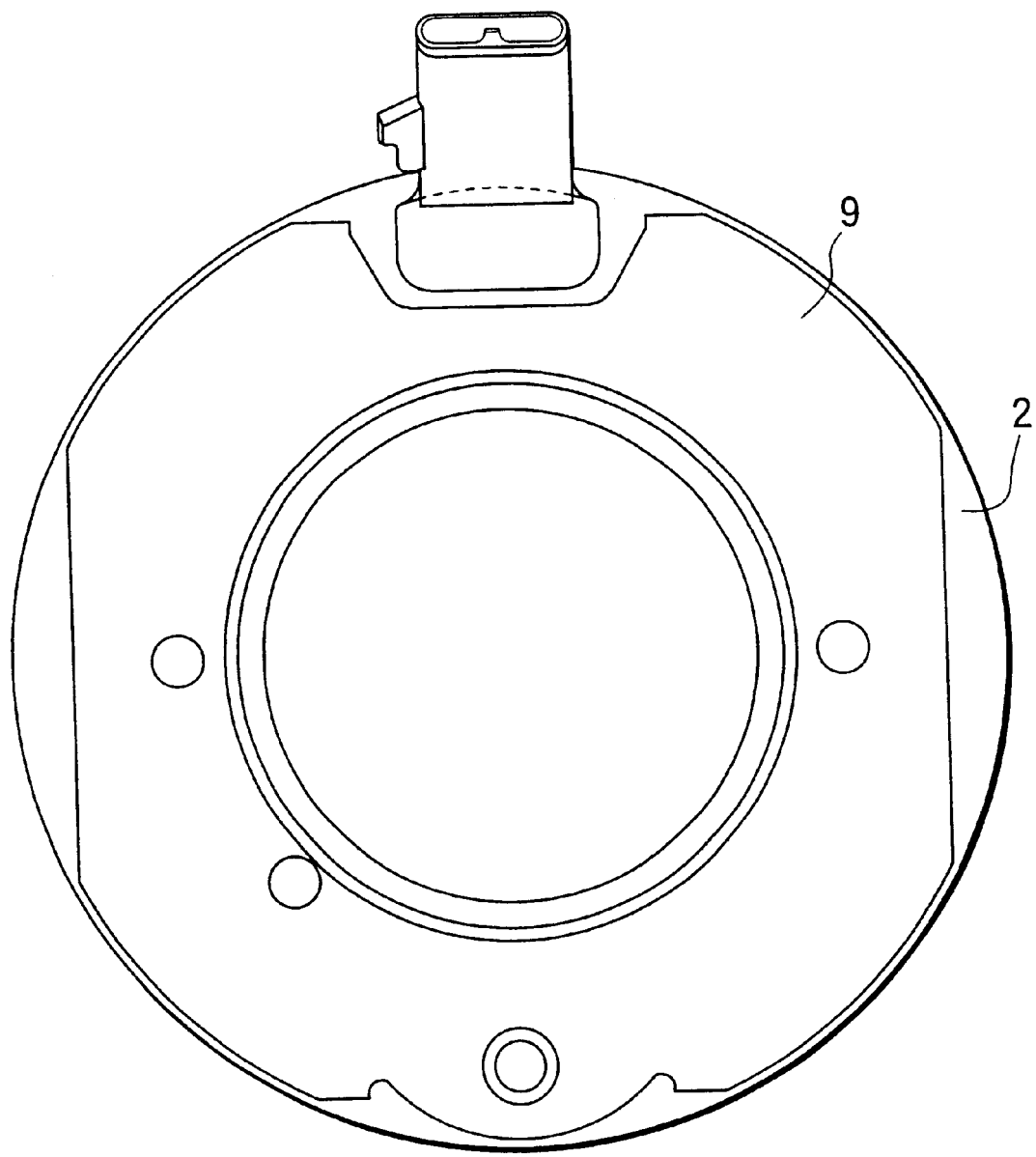
FIG. 3 is a rear elevation of a stator of the electromagnetic clutch viewed from right side in FIG. 1 according to the first embodiment of the present invention.

As shown in FIGS. 1 and 2, the arm portion 61e and the outer ring portion 61c are connected to the inner ring 5a and the outer ring 5b respectively by placing rivets 62 and 63 into the rivet holes 61f and 61g respectively. Accordingly, the inner ring 5a and the outer ring 5b are connected via the arm portion 61e.

The attachment portion 61b is fixed to the ring-shaped attachment flange 60b of the inner hub 60 by placing rivets 64 into the rivet holes 61h.

Elliptic embossed portions 61i extended in the radial direction are formed between the connecting portions 61d and the outer ring portion 61c. Each of the embossed portions 61i is formed by pressing toward the armature 5 such that it has a predetermined height h (for example, approximately 0.8 mm). The embossed portion 61i has the following two functions.

First, the axial location of the armature 5 is restricted to a predetermined position when the clutch is OFF (when the armature 5 is separated from the friction surface 4b of the rotor 4 as shown in FIG. 1) because the inner ring 5a and the outer ring 5b abut the embossed portions 61i as shown in lower half of FIG. 1.

Specifically, inner peripheral side of the embossed portion 61i (a portion closer to the rivet 64) is very close to the attachment flange 60b of the inner hub 60. Thus, the axial location of the armature 5 is restricted to a predetermined position while the inner peripheral side of the embossed portion 61i keeps proximately constant position regardless of the axial displacement of the armature 5 (ON and OFF of the clutch).

Second, the embossed portion 61i is located at an intermediate portion of a plurality of armature fixing portions (rivets 62, 63 and arm portion 61e) in the circumferential direction of the leaf spring 61, and abuts the inner ring 5a and the outer ring 5b of the armature 5. Thus, the outer peripheral ring portion 61c is elastically deformed in the circumferential direction and the axial direction corresponding to the embossed height h of the embossed portion 61i.

Consequently, an initial deflection is given to the leaf spring 61. A spring force, which tries to separate the armature 5 from the rotor 4, is generated on the leaf spring 61 by the initial deflection. Accordingly, the armature 5 is retained at a predetermined separated position by the generated spring force when the clutch is OFF. In other words, the embossed portion 61i functions as a deflection generating portion to give the initial deflection to the leaf spring 61.

A ring portion 60c, which inwardly protrudes from the inner periphery of the attachment flange 60b, is formed on the inner periphery of the attachment flange 60b. The hub 6 (inner hub 60) is unitarily connected to the drive shaft 8 by fixing the ring portion 60c to the tip of the drive shaft 8 by bolt 65.

Operations of the first embodiment will now be described.

When the electromagnetic coil 3 is not energized (when the clutch is OFF), the initial deflection is given to the outer ring portion 61c of the leaf spring 61 because of the embossed height h of the embossed portion 61i. The armature 5 is retained at a predetermined position which is separated from the friction surface 4b of the rotor 4 by the spring force caused by the initial deflection.

Accordingly, the rotational power is transmitted from a vehicle engine not shown to the rotor 4 via the V-belt, and is not transmitted to the armature 5 and the hub 6. Thus, only the rotor 4 idles on the bearing 11, and the compressor 7 keeps stopping.

When the electromagnetic coil 3 is energized, the armature 5 is attracted to the rotor 4 against the spring force of the leaf spring 61 by electromagnetic force generated by the electromagnetic coil 3. Thus, the armature 5 is attached to the friction surface 4b of the rotor 4. Accordingly, the rotation of the rotor 4 is transmitted to the drive shaft 8 of the compressor 7 via the armature 5, leaf spring 61 and inner hub 60 to operate the compressor 7.

When energizing the electromagnetic coil 3 is stopped, the electromagnetic force disappears. Accordingly, the armature 5 returns to the initial separated position according to the spring force of the leaf spring 61, and the compressor 7 stops.

While the armature 5 is attracted to the friction surface 4b of the rotor 4 by the electromagnetic force generated by the electromagnetic coil 3, the spring force of the leaf spring 61 nonlinearly increases rapidly.

Figure 6:
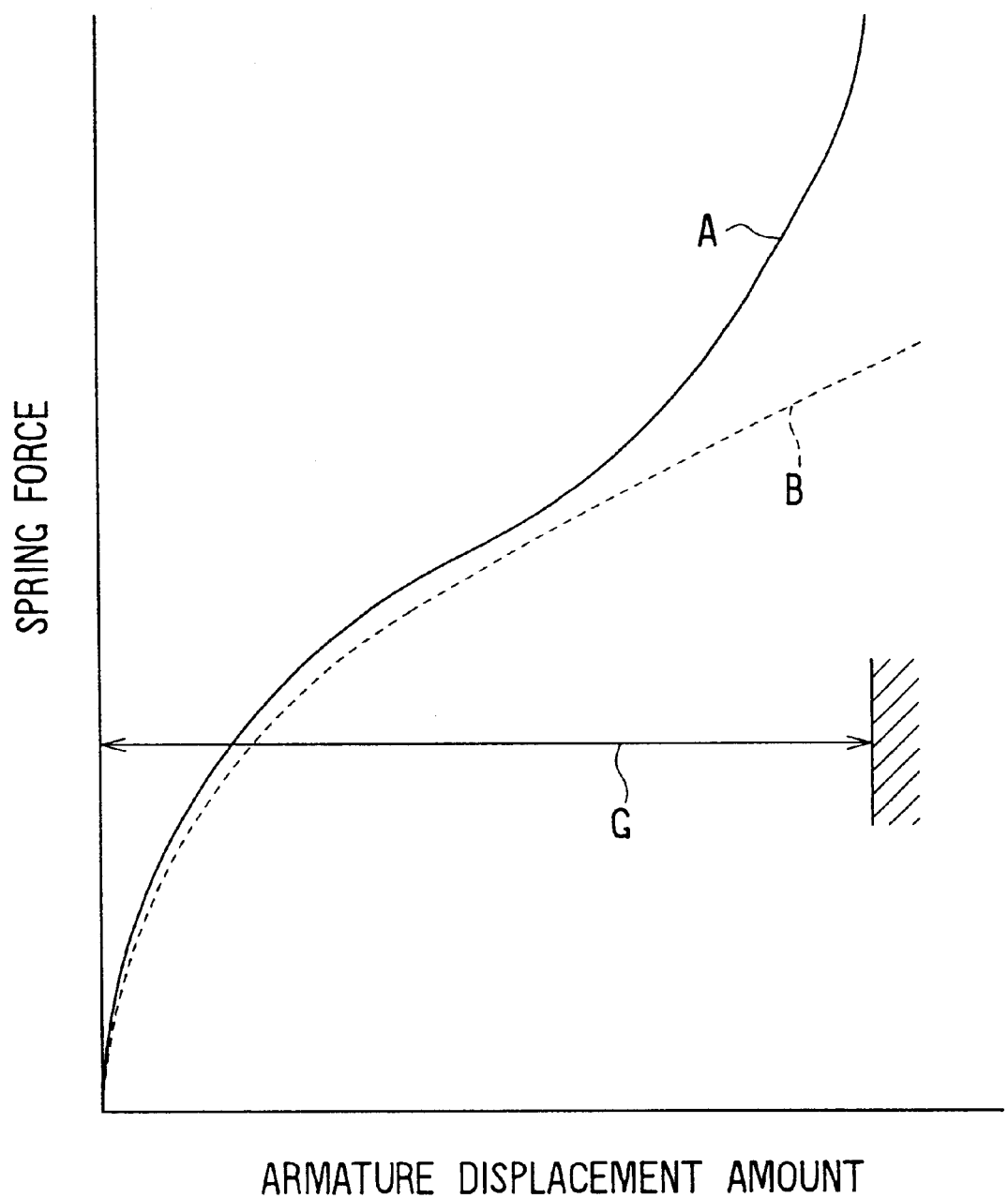
FIG. 6 is a characteristic curve of an operation of the leaf spring according to the first embodiment of the present invention.

In other words, in the attraction process of the armature 5, it is necessary to deform the outer ring portion 61c in axial and circumferential direction. Therefore, when displacement amount X of the armature 5 increases and approaches an attraction gap G as shown by characteristic A in FIG. 6, the spring force of the leaf spring 61 nonlinearly and rapidly increases. It is to be noted that the attraction gap G is a gap between the armature 5 and the friction surface 4b of the rotor 4 when the clutch is OFF as shown in FIG. 1.

If a plurality of elongated leaf springs used for a conventional technology are used, each of them deforms in axial and circumferential directions. Accordingly, the spring force increases approximately in proportion to the armature displacement amount as shown by characteristic B in FIG. 6 after the armature displacement amount of the armature 5 exceeds a displacement amount corresponding to the initial deflection of the leaf spring, and there is no rapid and nonlinear increase as shown by the characteristic A.

According to the first embodiment, since the spring force increases rapidly and nonlinearly as the armature displacement amount increases, the movement of the armature 5 is restricted before the armature 5 collides with the friction surface 4b of the rotor 4. Accordingly, the impact of the armature 5 against the rotor 4 is reduced, and the clutch operating noise is reduced.

Further, according to the first embodiment, the arm portion 61e and the connecting portion 61d are radially disposed from the center of the leaf spring 61, and the arm portion 61e and the connecting portion 61d vertically cross the magnetic shield gap 5c between the inner ring 5a and the outer ring 5b. Thus, the crossing area of the gap 5c crossed by the arm portion 61e and the connecting portion 61d is minimized.

Consequently, magnetic loss caused by the arm portion 61e and the connecting portion 61d is minimized even if the leaf spring 61 is made of magnetic material including iron.

The leaf spring 61 performs its spring function by elastically deforming the outer ring portion 61c and the connecting portion 61d between the rivet 63 and the rivet 64. In this case, the arc-shaped portion of the outer ring portion 61c is located at the most outside of the leaf spring 61, and maximizes its arc length.

Accordingly, the distance between the fulcrums (span) of the spring is increased, and spring force necessary for displacing the armature 5 in the axial direction is reduced. Thus, the required electromagnetic force of the electromagnetic coil 3 is reduced. Since the required electromagnetic force of the electromagnetic coil 3 is reduced and the magnetic loss is reduce, the electromagnetic coil 3 is reduced in size.

According to the conventional technology, it is necessary to place the flange portion of the hub outside the leaf spring in the axial direction because the initial deflection of the leaf spring is obtained by a cushion gum provided between the flange portion of the hub and the armature.

According to the first embodiment of the present invention, however, the initial deflection of the ring-shaped leaf spring 61 is obtained by the embossed portion 61i. Accordingly, only the leaf spring 61 is placed at the outside of the armature in the axial direction, and the flange 60b of the hub 6 is placed inside the leaf spring 61 in the axial direction. Consequently, the electromagnetic clutch is reduced in axial size compared to the prior art.

(Second Embodiment)

Figure 7:
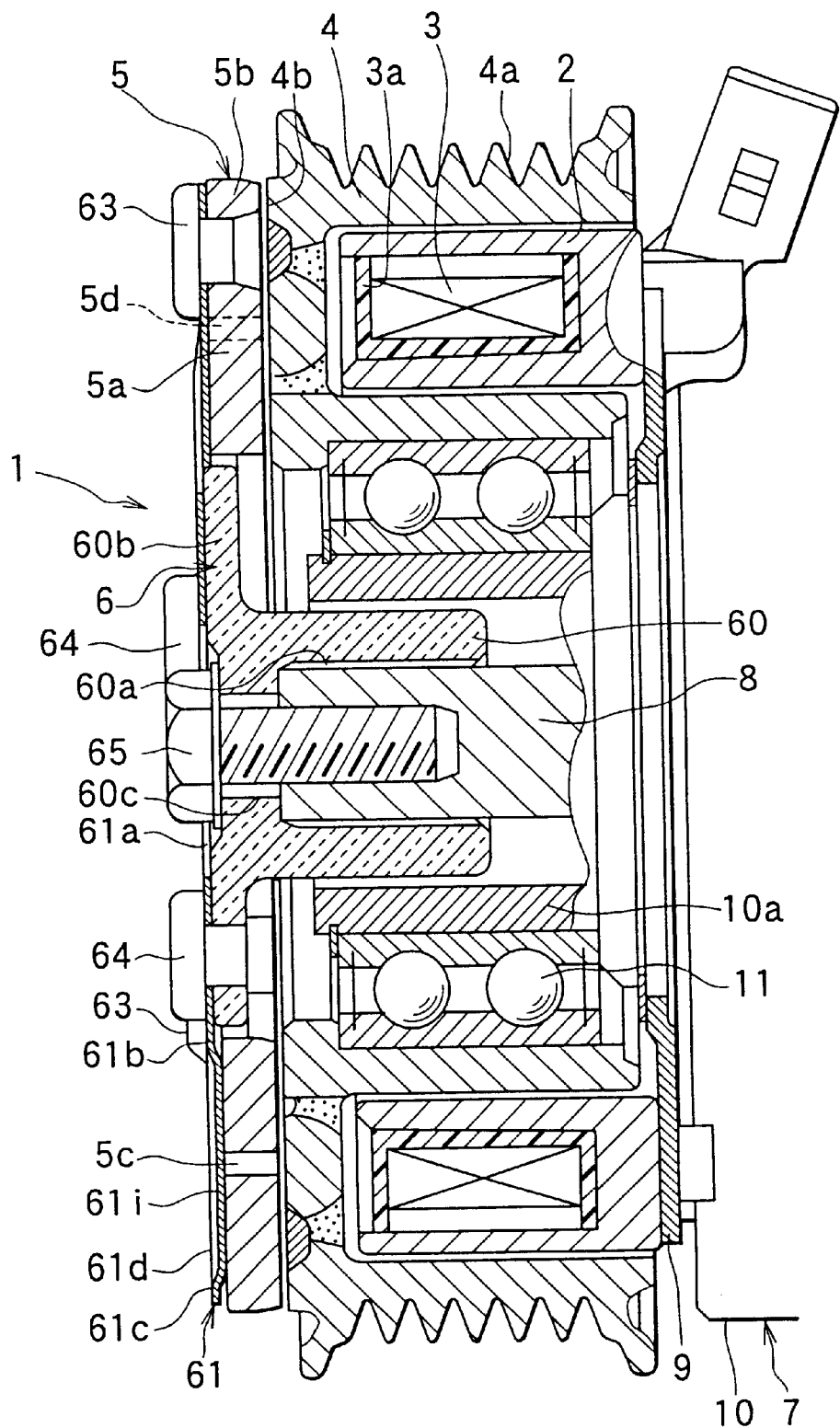
FIG. 7 is a longitudinal sectional view of an electromagnetic clutch according to a second embodiment of the present invention.
Figure 8:
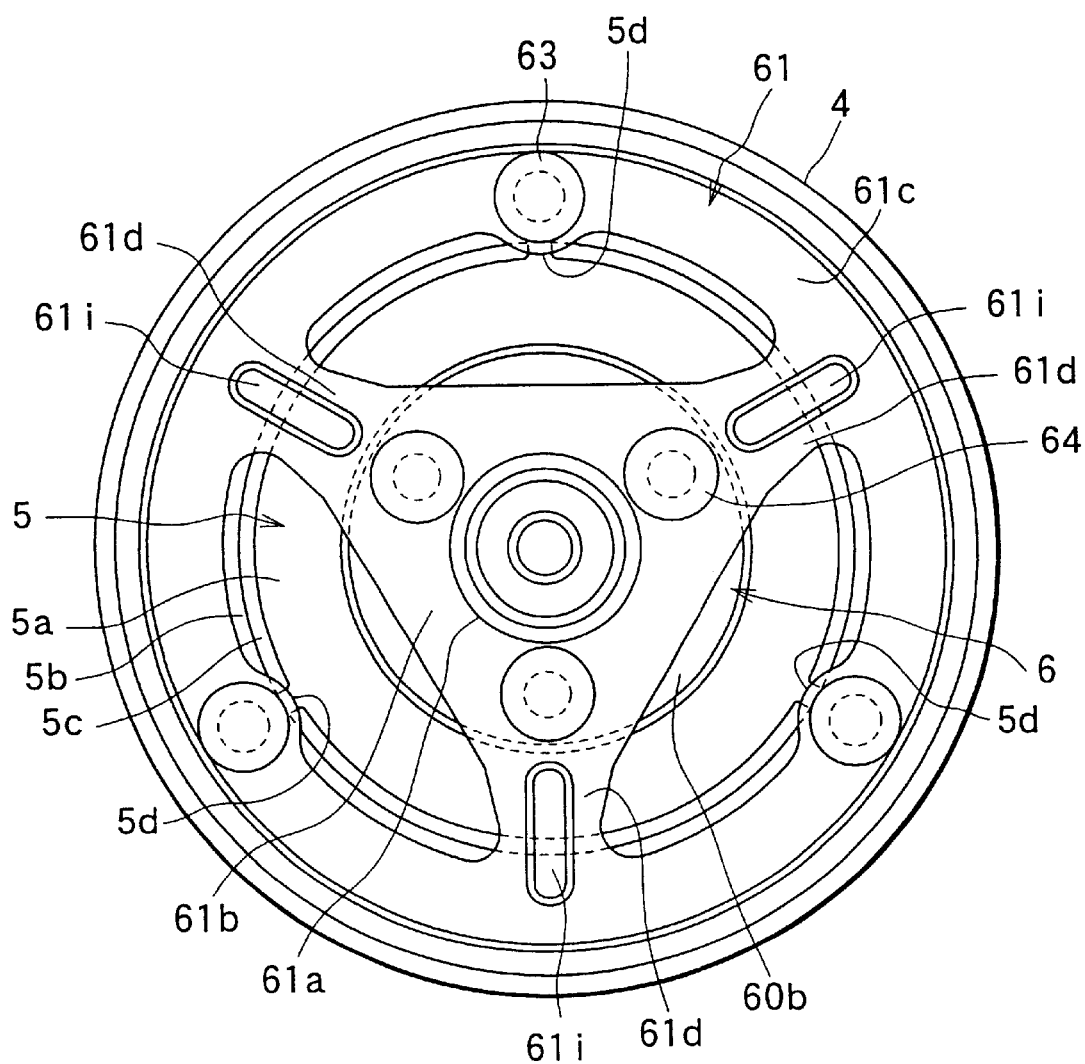
FIG. 8 is a front view of the electromagnetic clutch according to the second embodiment of the present invention.

A second embodiment of the present invention is shown in FIGS. 7 and 8. In this and the following embodiments, components which are substantially the same to those in the first embodiment are assigned the same reference numerals.

In the above first embodiment, the inner ring 5a and the outer ring 5b are totally separated, and they are unitarily connected by the arm portion 61e of the ring-shaped leaf spring 61.

According to the second embodiment, however, the inner ring 5a and the outer ring 5b are not totally separated, and are partially connected at three locations in the circumferential direction by bridges 5d.

Accordingly, the arm portion 61e and the rivet 62 in the first embodiment are obviated. As a result, it is enough to connect the outer ring portion 61c to the outer ring 5b by the rivet 63. The rest of the features of the second embodiment are the same as those in the first embodiment.

(Third Embodiment)

Figure 9:
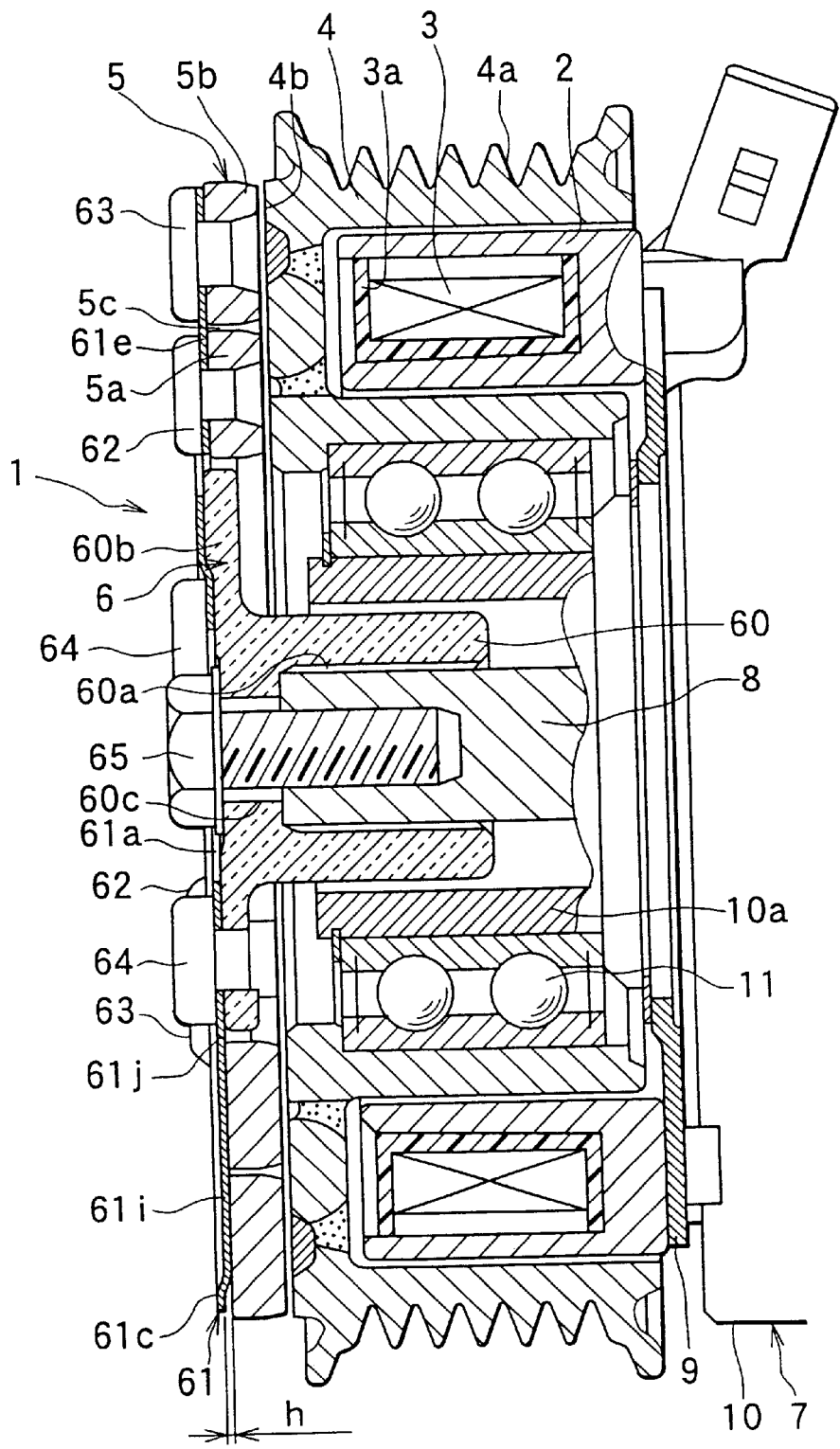
FIG. 9 is a longitudinal sectional view of an electromagnetic clutch according to a third embodiment of the present invention.
Figure 10:
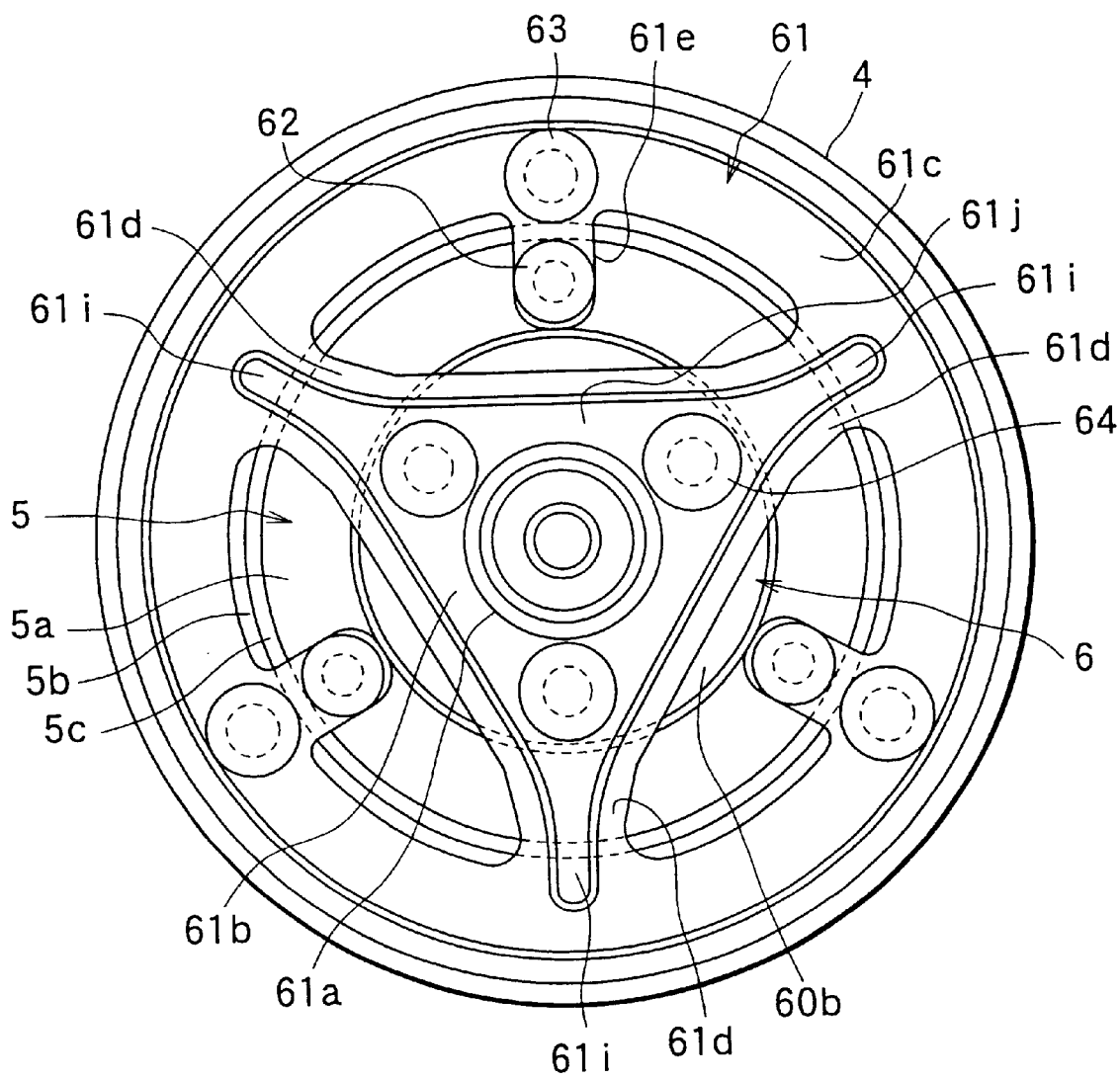
FIG. 10 is a front view of the electromagnetic clutch according to the third embodiment of the present invention.

A third embodiment of the present invention is shown in FIGS. 9 and 10. In the above first and second embodiments, the embossed portion 61i is embossed toward the armature 5 from the plate surface of the ring-shaped leaf spring 61.

According to the third embodiment, however, the embossed shape on the leaf spring 61 is changed. An embossed portion 61j having the embossed height h is formed on the attachment portion 61b.

As shown in FIG. 10, an outer shape of the embossed portion 61j has an approximately triangle shape corresponding to the outer shape of the attachment portion 61b.

In the third embodiment, the ring-shaped leaf spring 61 is fixed to the flange 60b of the hub 6 by rivet 64 at the embossed portion 61j. Accordingly, the embossing amount (height) of an head portion of the rivet 64 outwardly in the axial direction is reduced by the embossed height h compared to the first and second embodiments. Other features of the third embodiment are the same as those in the first embodiment.

(Fourth Embodiment)

Figure 11:
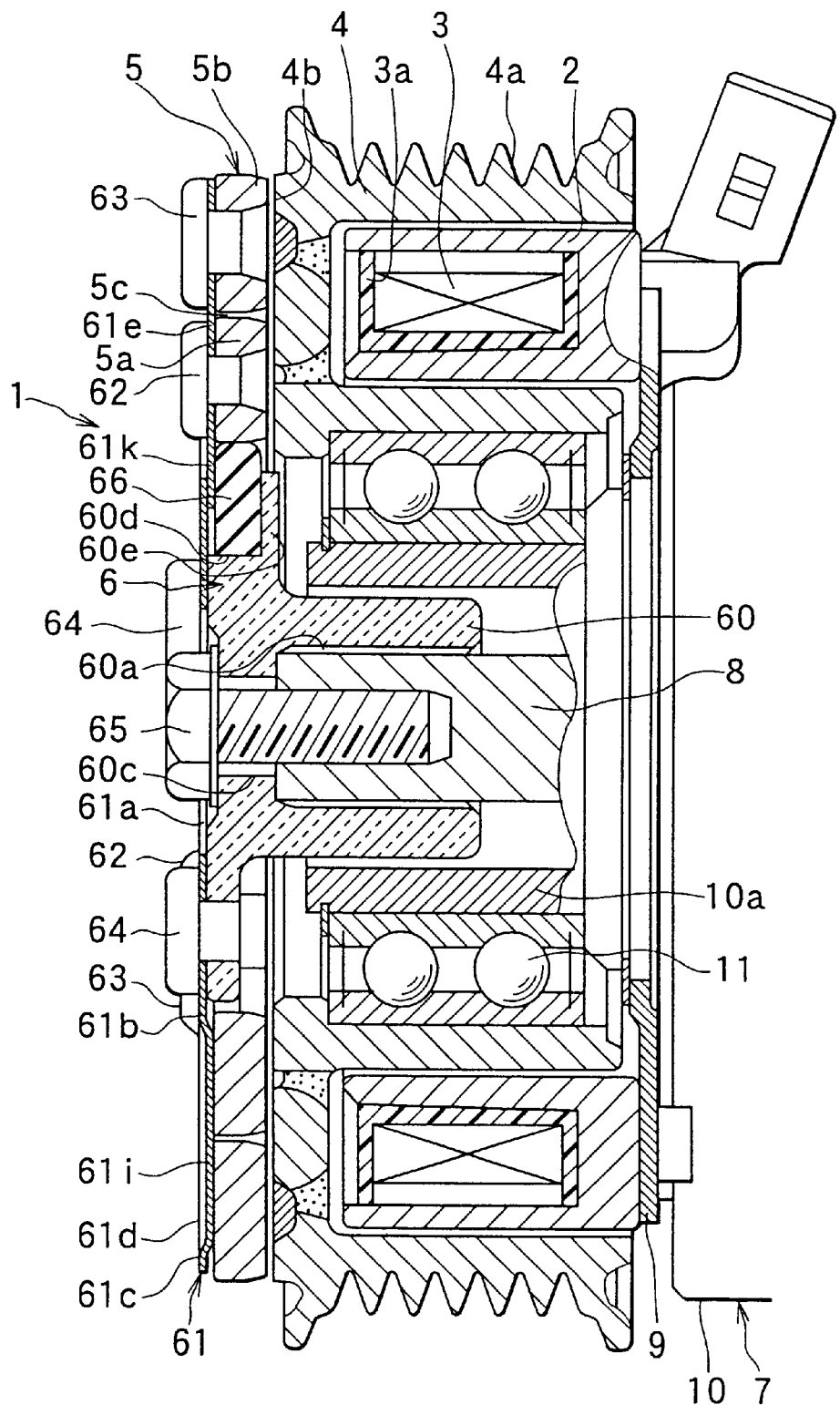
FIG. 11 is a longitudinal sectional view of an electromagnetic clutch according to a fourth embodiment of the present invention.
Figure 12:
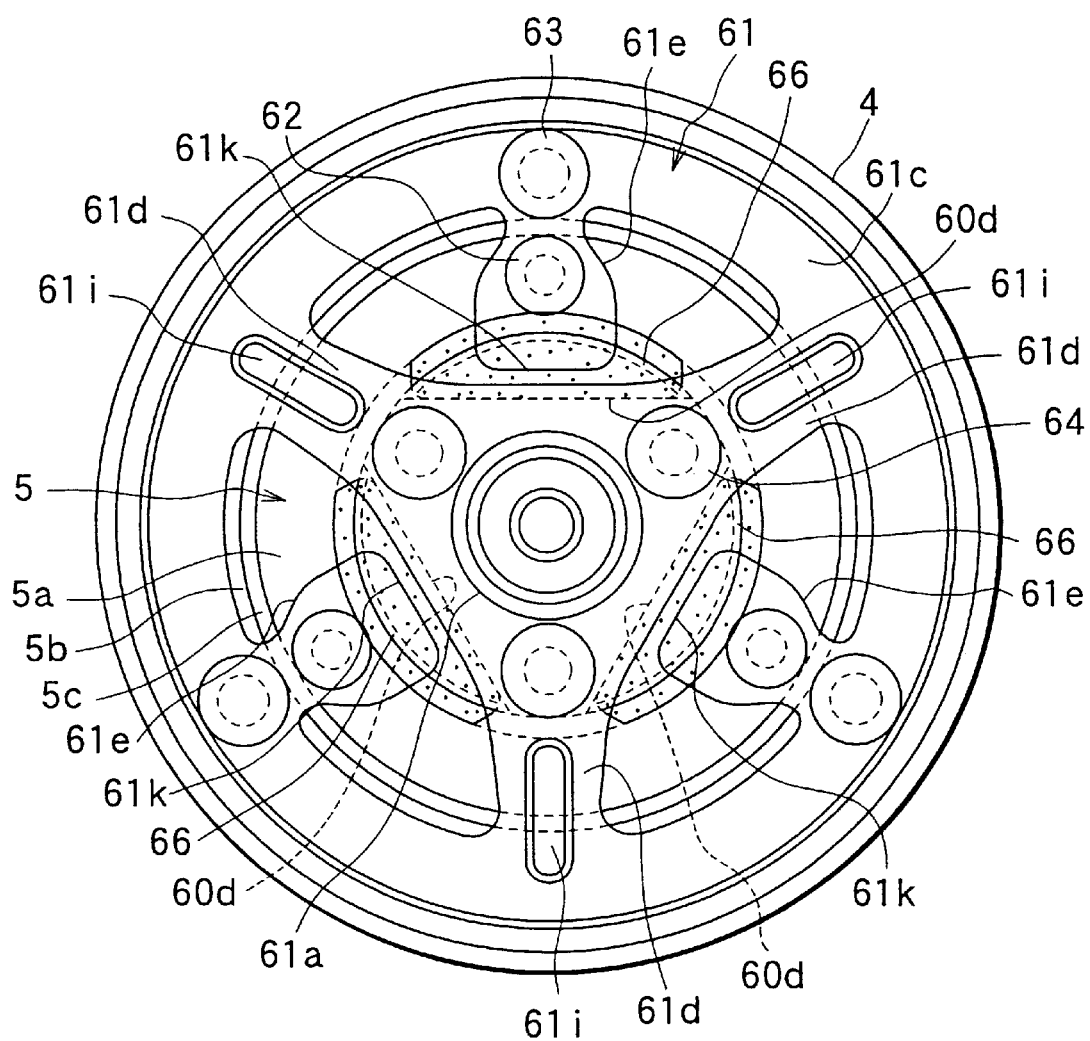
FIG. 12 is a front view of the electromagnetic clutch according to the fourth embodiment of the present invention.

A fourth embodiment of the present invention is shown in FIGS. 11 and 12. The fourth embodiment further reduces the clutch operating noise compared to the first to third embodiments.

In the fourth embodiment, an extended portion 61k, extended inwardly from the inner peripheral surface of the inner ring 5a of the armature 5, is formed on the tip of the arm portion 61e of the leaf spring 61.

Further, D-shaped notch 60d designated by a dotted area shown in FIG. 12 is formed on the flange 60b of the hub 6 such that the notch 60d is disposed opposite the extended portion 61k. Further, D-shaped back plate portion 60e is formed at the inside of the notch 60d in the axial direction.

D-shaped gum damper 66 (elastic member) is located at the concave portion of the notch 60d.

Accordingly, the arm portion 61e of the leaf spring 61 is axially displaced toward the rotor 4 with the armature 5 in the process that the armature 5 is attracted to the rotor 4 by the electromagnetic force of the electromagnetic coil 3 when the clutch is ON, although the axial location of the hub 6 is constant. Thus, the gum damper 66 is elastically compressed between the extended portion 61k and the back plate portion 60e as the displacement amount of the arm portion 61e increases.

Consequently, the elastic rebound force is generated on the gum damper 66, and increases rapidly right before the armature 5 is attached to the rotor 4. Thus, the impact of the armature 5 against the rotor 4 is reduced, and the clutch operating noise is also reduced. Other features of the fourth embodiment are the same as those in the first embodiment.

(Fifth Embodiment)

Figure 13:
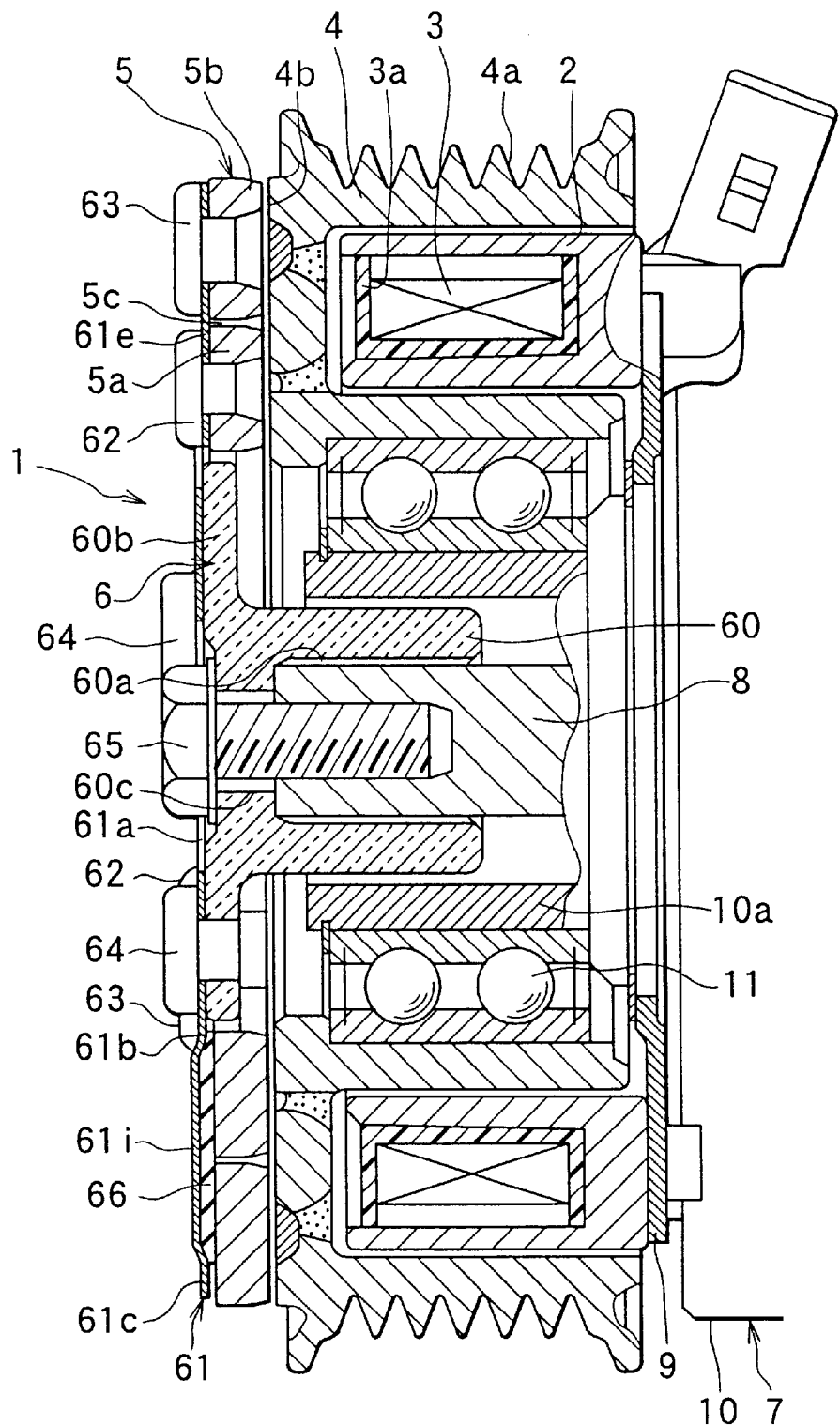
FIG. 13 is a longitudinal sectional view of an electromagnetic clutch according to a fifth embodiment of the present invention.
Figure 14:
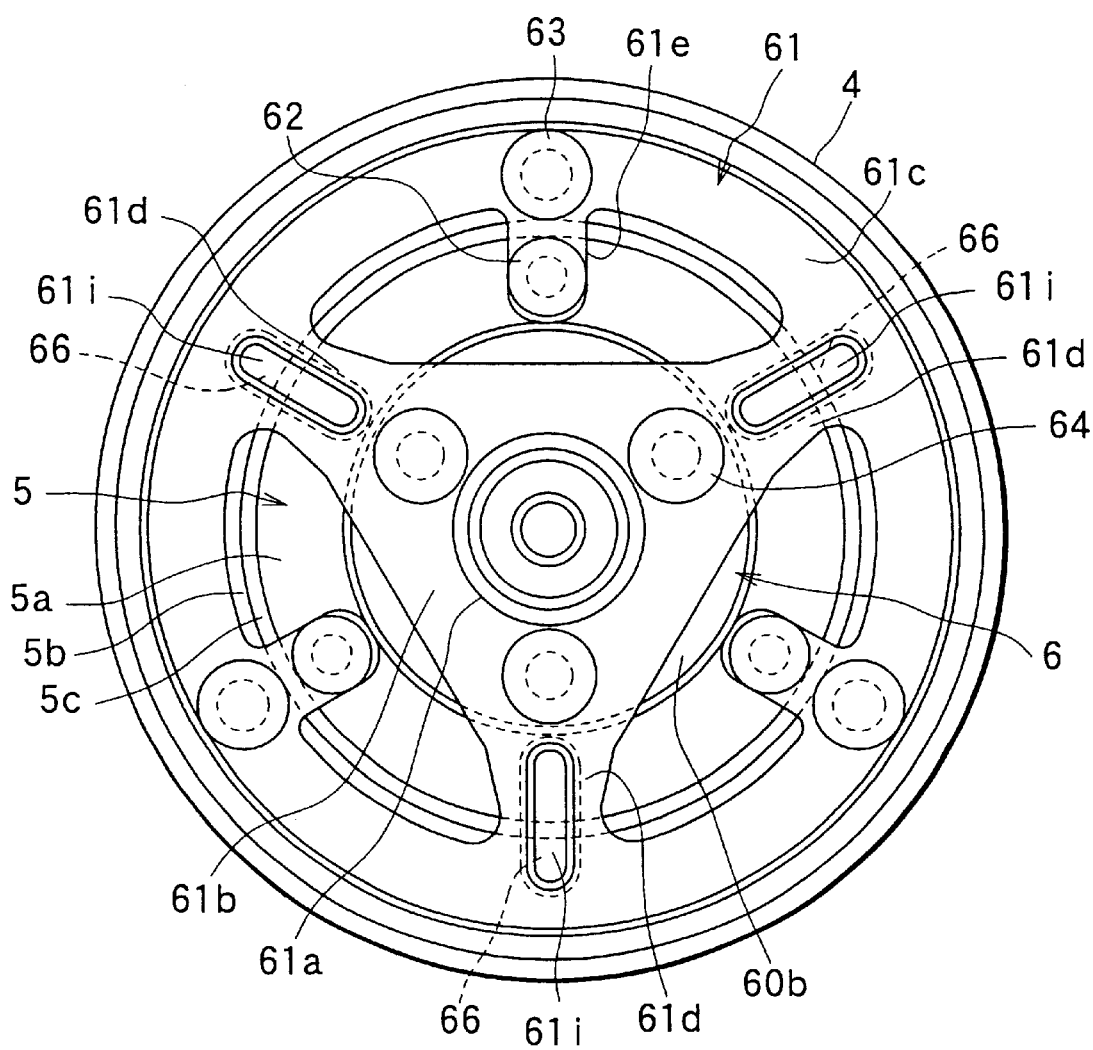
FIG. 14 is a front view of the electromagnetic clutch according to the fifth embodiment of the present invention.

A fifth embodiment of the present invention is shown in FIGS. 13 and 14.

In the fifth embodiment, the location of the gum damper 66 in the fourth embodiment is changed, and the embossing direction of the embossed portion 61i is opposite to that in the fourth embodiment, that is outwardly in the axial direction. Furthermore, the gum damper 66 is formed in the same shape as the embossed portion 61i (that is, longitudinal shape extended in the radial direction) to fit it in the inner concave portion of the embossed portion 61i. Accordingly, the gum damper 66 is placed between the inner surface of the embossed portion 61i and the inner and outer rings 5a, 5b of the armature 5.

Consequently, the initial deflection is given to the leaf spring 61 by the thickness of the gum damper 66 even if the embossing direction of the embossed portion 61i is outwardly in the axial direction.

According to the fifth embodiment, the attachment portion 61b of the leaf spring 61 is fixed to the flange 60b of the inner hub 60 and is not displaced in the process that the armature 5 is attracted to the rotor 4 by the electromagnetic force of the electromagnetic coil 3 when the clutch is ON. Therefore, the inner peripheral portion of the gum damper 66 which is adjacent to the rivet 64 does not follow the displacement of the armature 5 in the axial direction, and tries to leave the surface of the armature 5. However, the outer circumferential portion of the gum damper 66 (that is, a portion which is closer to the outer ring portion 61c of the leaf spring 61) follows the displacement of the armature 5 in the axial direction with the leaf spring 61 to maintain its contacting state with the surface of the armature 5.

Accordingly, after the armature 5 collides with the friction surface 4b of the rotor 4, the elasticity of the gum damper 66 absorbs the vibration of the armature 5. Thus, the vibrational noise of the armature 5 is reduced.

When the armature 5 is detached from the friction surface 4b of the rotor 4 to return to its initial position (when the clutch is OFF), the armature 5 abuts the gum damper 66 to determine the axial position without contacting the metal surface of the embossed portion 61i of the leaf spring 61. Accordingly, the operating noise when the clutch is OFF is also reduced.

According to the fifth embodiment of the present invention, the gum damper 66 functions as an anti-vibration mechanism for the armature when the clutch is ON. Therefore, the vibrational noise of the armature 5 is reduced, and the operating noise when the clutch is OFF is also reduced.

(Sixth Embodiment)

Figure 15:
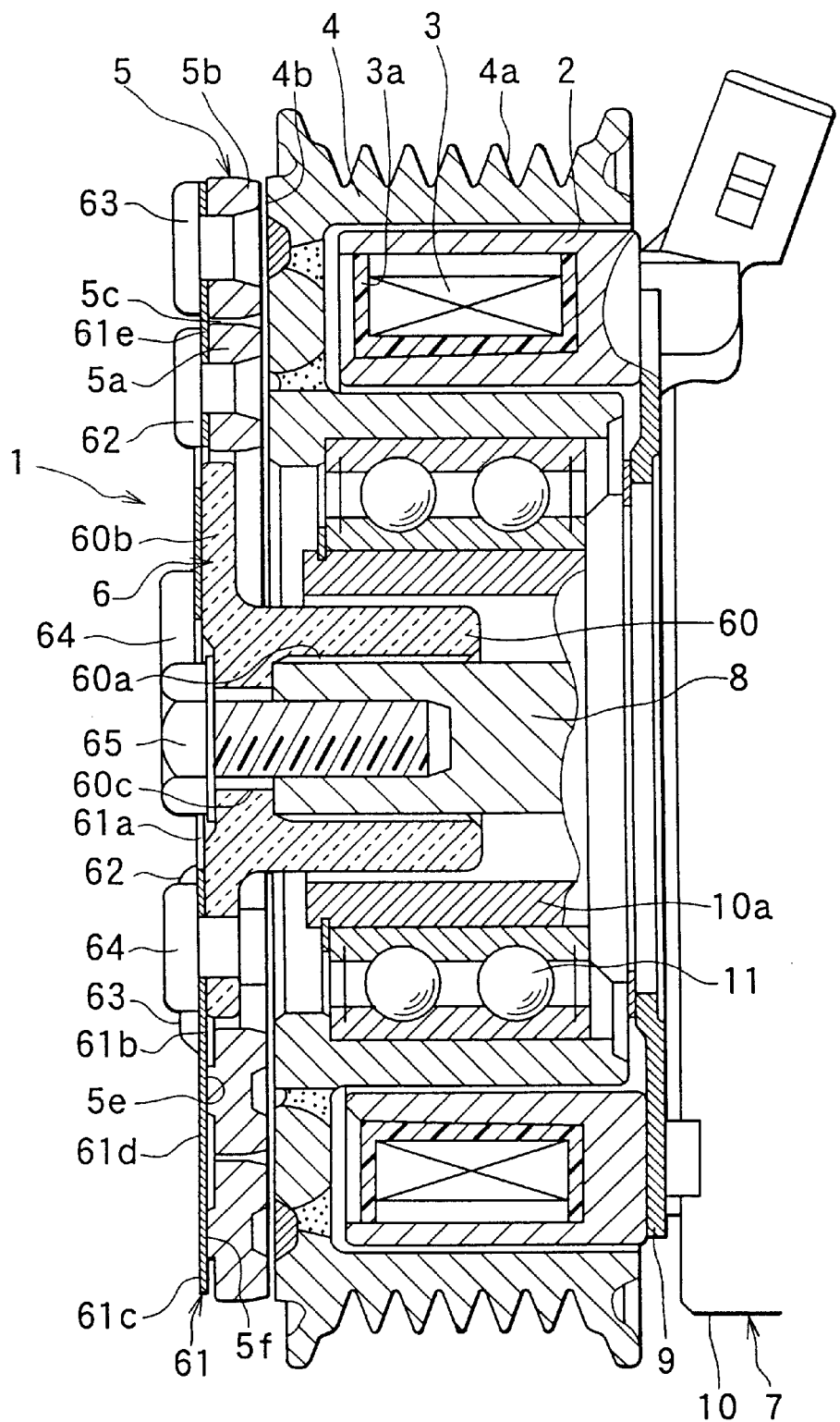
FIG. 15 is a longitudinal sectional view of an electromagnetic clutch according to a sixth embodiment of the present invention.
Figure 16:
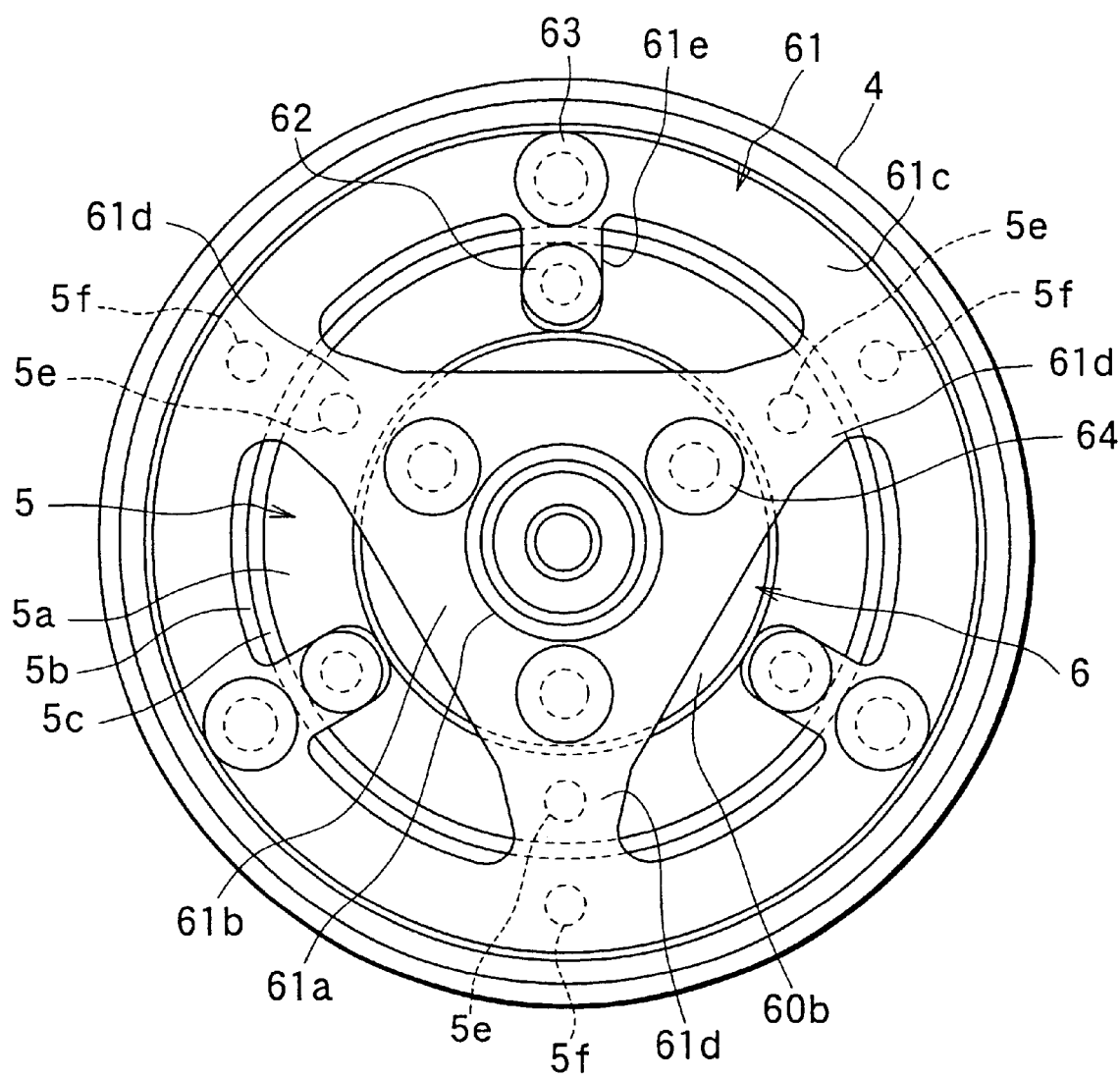
FIG. 16 is a front view of the electromagnetic clutch according to the sixth embodiment of the present invention.

A sixth embodiment of the present invention is shown in FIGS. 15 and 16. In the first through fourth embodiments of the present invention, the embossed portion 61i embossed toward the armature 5 is formed on the leaf spring 61 to generate the initial deflection on the leaf spring 61.

According to the sixth embodiment, however, embossed portions 5e and 5f protruding toward the leaf spring 61 are formed on the armature 5 instead of forming the embossed portion 61i.

As shown in FIG. 16, three circular embossed portions 5e and three circular embossed portions 5f are embossed by press working on the inner ring 5a and the outer ring 5b respectively keeping the same gap among them in the circumferential direction.

The embossed locations in the circumferential direction of the embossed portions 5e and 5f are corresponding locations opposite three connecting portions 61d and outer circumferential side of the connecting portion 61d of the outer ring portion 61c (intermediate portion of the rivet 63).

According to the sixth embodiment of the present invention, the initial deflection of the leaf spring 61 is obtained by the embossed height h of the embossed portions 5e and 5f. Thus, the same advantage as the first embodiment is obtained.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An electromagnetic clutch for selectively transmitting rotational force from a rotational power generating source to a slave-side equipment to be driven, said electromagnetic clutch comprising:

a drive-side rotating member which is rotated by the rotational force;

an electromagnetic coil for generating electromagnetic force when said electromagnetic coil is energized;

a slave-side rotating member connected to the slave-side equipment;

an armature which is coupled with said drive-side rotating member in response to the electromagnetic force generated by said electromagnetic coil; and a ring-shaped leaf spring for supporting said armature such that said armature is capable of being displaced toward said drive-said rotating member;

wherein said ring-shaped leaf spring includes an outer ring portion connected to said armature, an attachment portion connected to said slave-side rotating member, and a connecting portion for connecting said outer ring portion and said attachment portion;

said outer ring portion includes a plurality of fixing portions arranged in a circumferential direction thereof;

a deflection generating portion for generating an initial deflection of said outer ring portion is disposed between said fixing portions; and said deflection generating portion is configured to cause the initial deflection of said outer ring portion while said electromagnetic coil is unenergized.

2. An electromagnetic clutch according to claim 1, wherein:

said deflection generating portion includes a first embossed portion formed on said outer ring portion and protruding toward said armature from an intermediate portion located between said fixing portions in a circumferential direction of said outer ring portion.

3. An electromagnetic clutch according to claim 2, wherein:

said attachment portion includes a second embossed portion embossed in the same direction as said first embossed portion; and said leaf spring is connected to said slave-side rotating member at said second embossed portion.

4. An electromagnetic clutch according to claim 1, wherein said deflection generating portion includes an embossed portion protruding toward an opposite direction to said armature from an intermediate portion located between said fixing portions in the circumferential direction of said outer ring portion and an elastic member disposed in a concave portion of said embossed portion so as to press said armature.

5. An electromagnetic clutch according to claim 1, wherein;

said deflection generating portion includes an embossed portion formed on said armature and protruding toward said leaf spring from an intermediate portion located between said fixing portions in a circumferential direction of said armature.

6. An electromagnetic clutch according to claim 1, wherein;

said armature includes an inner ring and an outer ring; and said leaf spring includes an arm portion for unitarily connecting said inner ring to said outer ring.

7. An electromagnetic clutch according to claim 1, wherein;

the electromagnetic clutch includes an elastic member disposed in a gap formed between said leaf spring and said slave-side rotating member in an axial direction of said slave-side rotating member; and said elastic member is compressed between said leaf spring and said slave-side rotating member as said armature is displaced toward said drive-side rotating member in an axial direction of said drive-side rotating member according to said electromagnetic force of said electromagnetic coil.

8. An electromagnetic clutch according to claim 1, wherein when said electromagnetic coil is not energized, said deflection generating portion generates the initial deflection in said outer ring portion for urging said armature with respect to said drive-side rotating member to provide a predetermined slight gap therebetween.

* * * * *